2,840,607

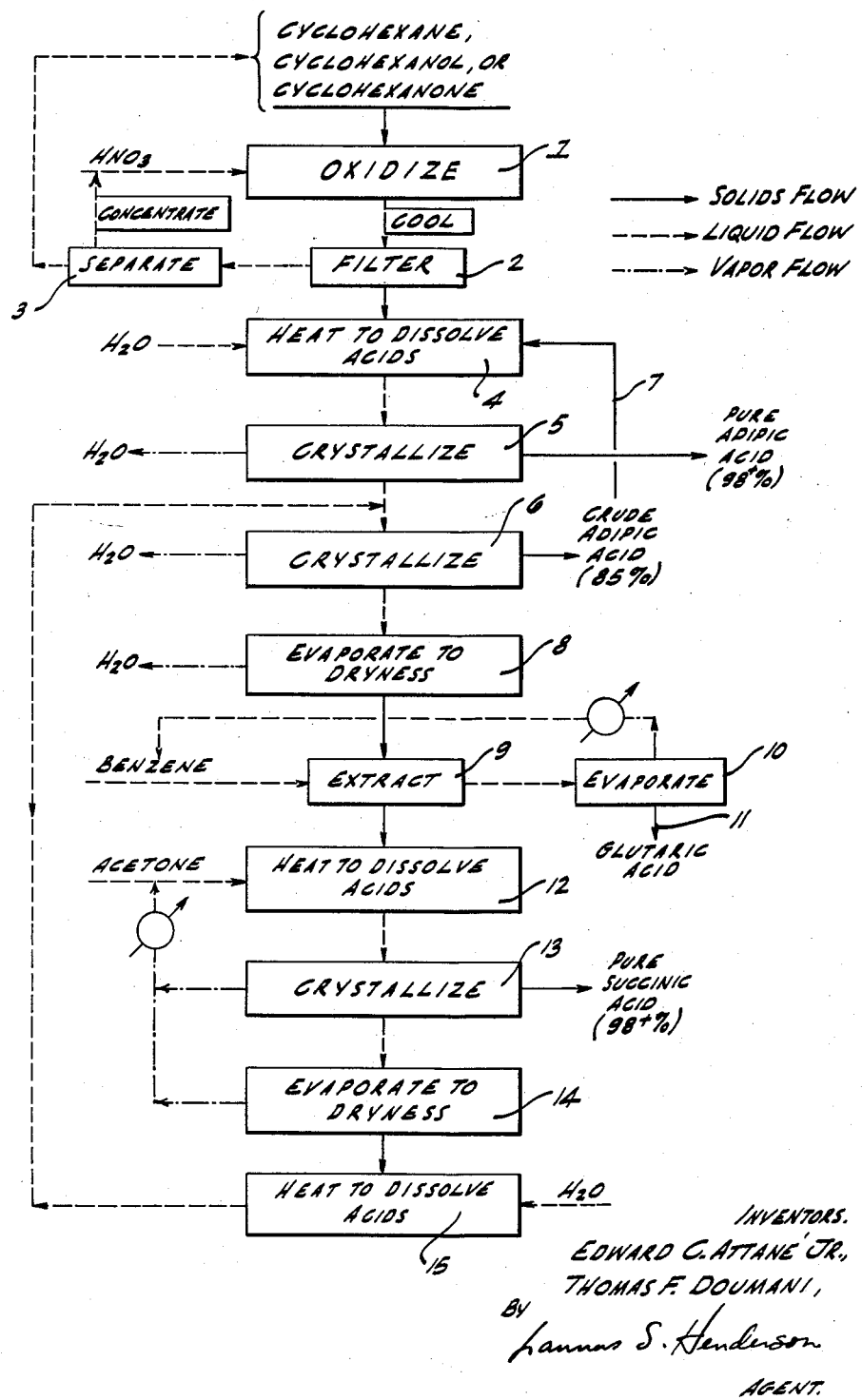

SEPARATION OF DIBASIC ACIDS

Edward C. Attane, Jr., Fullerton, and Thomas F. Doumani, Whittier, Calif., assignors to Union Oil Company of California, Los Angeles, Calif., a corporation of California Application February 20, 1956, Serial No. 566,671

11 Claims. (Cl. 260—537)

This invention relates to improved methods for purifying crude adipic acid such as is obtained by the oxidation of cyclohexane, cyclohexanone or cyclohexanol with nitric acid. More generally, the process is applicable to the separation of mixtures of adipic acid and succinic acid, which may or may not contain other dibasic acids such as glutaric acid. Briefly stated, the method may be said to comprise a cyclic fractional crystallization procedure, wherein adipic acid is crystallized from an aqueous solvent until the mother liquor becomes too concentrated in succinic acid to give a sufficiently pure crop of adipic acid crystals, and the remaining solute in the aqueous mother liquor is then recovered, dissolved in a ketone solvent and fractionally crystallized to recover therefrom relatively pure succinic acid. The crystallization from the ketone solvent is continued until a high ratio of adipic to succinic acid is again established in the mother liquor, after which the ketone solvent is evaporated and the residue may be again subjected to fractional crystallization from aqueous solvents to recover further quantities of adipic acid.

The principal object of the invention is to provide economical methods for separating adipic and succinic acids, whereby each acid may be recovered in pure form and in substantially 100% yields. A specific object is to avoid the waste of valuable byproducts from the oxidation of cycloaliphatic compounds. Other objects will be apparent from the description which follows.

The oxidation mixtures treated herein commonly result from well-known processes for oxidizing naphthenes, cycloaliphatic ketones or cycloaliphatic alcohols with nitric acid. The oxidation step per se forms no part of the present invention and hence will not be described in detail. In general such processes involve heating cyclohexane, cyclohexanol, and/or cyclohexanone for example with nitric acid, at for example 100°–350° C., utilizing nitric acid of about 20–90% strength. The resulting oxidation mixtures comprise the solid dibasic acids, together with small amounts of unreacted cyclohexane, cyclohexanone or cyclohexanol, and aqueous nitric acid. In the past the adipic acid has generally been purified by redissolving the organic acids in water, evaporating the mixture, and cooling to recover crystalline adipic acid. Ordinarily the oxidation mixture will contain a dibasic acid distribution about as follows: 80–90% by weight adipic acid, 5–15% succinic acid and 3–10% glutaric acid. The fractional crystallization of such liquors may be continued, obtaining successively less pure crops of adipic acid, until ultimately a mother liquor is obtained wherein the adipic/succinic acid ratio is about 20/80 by weight. This ratio represents the approximate relative solubilities of the two acids in water, succinic acid being more soluble. However, at this point no further resolution of the acids is possible by conventional fractional crystallization from water because the solid phase will have substantially the same composition as the mother liquor solute.

It has now been found that adipic and succinic acids are more nearly equally soluble in ketones, as contrasted to their considerably different solubilities in water. Hence, when the mother liquor from the aqueous adipic acid crystallization becomes substantially saturated with both acids so that further resolution is impossible, the solute is recovered by evaporating the solvent, and is then fractionally crystallized from the ketone solvent at a temperature sufficient to hold in solution all of the adipic acid but insufficient to dissolve all of the succinic acid. A crop of substantially pure succinic acid crystals is thus obtained either by partially evaporating the solvent, and/or by cooling. The first crystalline strike from the ketone solvent will ordinarily constitute the purest succinic acid; successive strikes may be obtained of decreasing purity, until the ketone mother liquor is saturated with both acids, at which point further resolution is not possible from this solvent. The ketone is then evaporated from the mixture and the remaining solid may be recycled to the aqueous crystallization step.

The process may be initiated with fractional crystallization from either the ketone solvent or the aqueous solvent, depending upon the initial composition of the mixture to be separated. Normally, when the mixture contains at least about one part by weight of adipic acid per part of succinic acid, it is preferable to crystallize first from water, and to continue such fractional crystallization at least until the mother liquor contains less than about one part of adipic acid per part of succinic acid. The mother liquor solute is then recovered by evaporation, and is dissolved in the ketone solvent and fractionally crystallized to recover succinic acid. Conversely, when the initial mixture contains less than about one part by weight of adipic acid per part of succinic acid, it is preferable to crystallize first the succinic acid from the ketone solvent, e. g. methyl ethyl ketone, and to continue such crystallization until the mother liquor contains more than about one part of adipic acid per part of succinic acid. The ketone solvent is then evaporated, and the residue subjected to aqueous fractional crystallization.

It is also contemplated that the crystallization from aqueous solvents, and the crystallization from ketone solvents may be conducted in multiple stages, and the mother liquor solute from any single ketone crystallization stage may be recycled to any desired stage of the aqueous crystallization system, and vice versa. By this means optimum efficiency and purity of products may be obtained. The advantages of the process will be readily apparent; each of the dibasic acids of the oxidation mixture may be recovered in pure state, and none of the mother liquors are wasted. Substantially 100% of both adipic and succinic acid may be recovered from the oxidation mixtures.

The other principal contaminant of the instant oxidation mixtures, glutaric acid, is more soluble in water than either succinic or adipic acid. It may therefore be carried through the first aqueous crystallization series, and will appear in the dry residue from the evaporation of aqueous mothehr liquor, which residue is supplied to the first ketone crystallization stage. The glutaric acid is conveniently recovered in substantially pure form at this stage by extracting the solid residue with an aromatic hydrocarbon such as benzene, toluene, xylene or the like. Glutaric acid is substantially soluble in such solvents while adipic and succinic acids are substantially insoluble. The hydrocarbon solution is then evaporated to recover the glutaric acid content. Further purification may be had by recrystallization from the aromatic hydrocarbon.

It is important to note herein that the crystalline products obtained in the various crystallization steps are not further purified by recrystallization from solvents other than their own mother liquor solvents. In other words, the pure adipic acid obtained by crystallization from water is not advantageously further purified by crystallization from acetone; this would be disadvantageous because the succinic acid impurity is less soluble in acetone, relative to adipic acid, than it is in water. Consequently, more effective purification would be obtained by simply recrystallizing the product from water. The same applies to the succinic acid crystals obtained from the ketone solvent; their purification is best effected by recrystallizing from the ketone and not from water.

The ketone solvents employed herein may comprise any sufficiently low boiling ketone which does not contain interfering functional groups. The lower aliphatic ketones are preferred. Suitable examples include for example acetone, methyl ethyl ketone, diethyl ketone, ethyl propyl ketone, methyl propyl ketone, cyclohexanone, cyclopentanone, methyl phenol ketone and the like.

The invention may perhaps be more readily understood by reference to the accompanying drawing which is a flow sheet showing one particular mode of carrying out the process in relation to the recovery of products from the oxidation of cyclohexane. The invention should not however be construed as limited to the details shown.

The oxidation step is indicated generally at 1, and is conducted in the usual fashion with e. g. 70% nitric acid at 300° C. The oxidation mixture is then cooled to e. g. 0–80° C. and passed to filtration step 2, wherein solid dibasic acids are separated from a liquid phase comprising unreacted cyclohexane and dilute nitric acid. The latter two products are separated at step 3 and recycled as shown. Sufficient water and heat is then added at step 4 to the dibasic acid mixture to dissolve all the solid acids. The hot mixture is then evaporated and/or cooled at step 5 to effect fractional crystallization. The major part of the adipic acid is recovered from this step, and is ordinarily 98–100% pure. It will be understood that the purity of product obtained in this step may be controlled at will by varying the temperature of crystallization, and/or the amount of solvent evaporated. The more complete recovery entails lower purity, while high purity is obtained by limiting the recovery. In addition, a purer product is ordinarily obtained by allowing the crystallization to take place over an extended period of time, for example 1–2 hours. The crystallized adipic acid is recovered by conventional methods as by filtration, decantation, centrifugation, etc.

The mother liquor from crystallization step 5 is then further cooled or evaporated in crystallization step 6 in order to recover a less pure crop of adipic acid crystals. This crude adipic acid crop may be for example 70–80% pure. This material is recycled via line 7 to be recrystallized in step 5 as previously described, inasmuch as its composition may advantageously be substantially the same as that of the crude acids from step 2. The mother liquor from step 6 is then transferred to evaporation step 8 wherein all of the solvent is evaporated. The solid residue from evaporation step 8 is then extracted at step 9 with benzene in order to remove glutaric acid. The benzene extract is then transferred to evaporation step 10 wherein the benzene is recovered and recycled, while solid glutaric acid is taken off through line 11 for further purification if desired.

The solid residue from step 9 is then preferably blown with air, or heated, or otherwise treated to remove any adhering benzene. The dried solid is then dissolved in hot ketone solvent, e. g. acetone at step 12. The acetone solution is then transferred to a crystallization step 13 from which pure solid succinic acid is recovered, the purity ranging between 97–100%. The crystallization is here conducted in a manner which may be similar to that of step 5, the solution being either cooled or evaporated to obtain the desired degree of fractional crystallization.

The removal of succinic acid at step 13 renders the mother liquor solute sufficiently concentrated in adipic acid to be further purified by crystallization from water. The mother liquor is hence transferred to evaporation step 14 wherein the acetone is completely removed by evaporation and recycled to step 12. The solid residue from step 14 is then redissolved in water at step 15, and recycled preferably to the second aqueous crystallization step 6 for recovery of crude adipic acid therefrom, the concentration of adipic acid in the acetone residue not being as high as that in the feed liquor to step 5. However, if the crystallization step 13 is carried out for maximum recovery of succinic acid (involving a lower purity), or if a second acetone crystallization stage is employed, the final residue from step 14 may be sufficiently concentrated in adipic acid that it may be recycled to first aqueous crystallization step 5.

As another possible alternative in the above recovery scheme, the recovery of crude adipic acid at step 6 may be omitted, and the mother liquor from step 5 directly evaporated to dryness. In this case, it would be highly desirable to employ a two-stage crystallization from acetone in order to recover a pure succinic acid product from the first stage, and a less pure crop from the second stage.

To exemplify more specifically the results obtainable on a continuous basis by the process illustrated in the flow sheet, the following materials balance is cited showing the approximate product distribution from the various steps for an oxidation mixture from step 1 which comprises 587 parts per hour of mixed dibasic acids, of which 85% by weight is adipic, 10% succinic and 5% glutaric:

| | Parts per hour |
|---|---|
| Pure adipic acid from crystallization step 5 (98% pure) | 499 |
| Crude adipic acid from crystallization step 6 (85% pure) | 43 |
| Crude glutaric acid from evaporation step 10 | 29 |
| Pure succinic acid from crystallization step 13 (97% pure) | 58 |
| Solid residue from evaporation step 14 (38.5% adipic acid, 61.5% succinic acid) | 52 |

It will be apparent that the above process scheme envisions substantially 100% recovery of each of the three principal acids contained in the oxidate. The purity of each of the products from crystallization steps 5 and 13 may be further improved by recrystallization from water or acetone respectively. In each case substantially 100% pure products may be obtained.

The critical solubility relationships involved herein may be more readily apparent from the following examples, which are not to be construed as limiting in scope.

*Example 1*

A mixture of 80 grams of succinic acid and 20 grams of adipic acid was dissolved in 1200 ml. of boiling anhydrous acetone. After cooling the solution to 20° C., the solid was filtered off and found to consist of 48 grams of 99% pure succinic acid. The mother liquor was then evaporated to dryness leaving 52 gms. of a solid residue composed of 32 grams (61.5%) of succinic acid and 20 grams (38.5%) of adipic acid. This mixture was then dissolved in 562 ml. of boiling water and the solution was cooled to 15° C. 12 grams of substantially pure adipic acid was recovered from the cooled aqueous solution. The filtrate was then evaporated to dryness giving 40 grams of solid which was 20% adipic acid and 80% succinic acid. Since this final mixture has the same composition as the initial acid mixture, it may be recycled to extinction with the feed.

This example demonstrates that 100% recovery of both acids may be obtained. The recovery of adipic acid per crystallization was 60%, as was the succinic acid recovery per crystallization step.

Example II

A mixture of 80 grams of succinic acid and 20 grams of adipic acid was dissolved in 800 grams of methyl ethyl ketone heated to above its boiling point under pressure. The solution was then cooled to 20° C. and the solid was filtered off and dried. The solid material was 65.3 grams of substantially pure succinic acid. The filtrate was then evaporated to dryness to give a mixture composed of 20 grams adipic acid and 14.7 grams succinic acid. This solid mixture was then dissolved in 260 ml. of boiling water and cooled to 15° C. 16.3 grams of substantially pure adipic acid was recovered by filtration. The filtrate was evaporated to recover 3.7 grams adipic acid and 14.7 grams of succinic acid, which is substantially the same composition as the original mixture of acids and hence may be recycled to extinction. This example, utilizing methyl ethyl ketone, shows a recovery of adipic and succinic acids per crystallization step of 81.5%.

Results substantially similar to the above examples are obtained when other ketone solvents are employed herein. It is also contemplated that mixed ketones may be employed, and these solvents may be further modified with other solvents, e. g. alcohols, chloroform and the like. The aqueous solvents may also be modified, particularly with minor proportions, e. g. 5–30% by volume of lower aliphatic alcohols. The foregoing disclosure should therefore not be considered limiting in scope since many variations may be made by those skilled in the art without departing from the scope or spirit of the following claims.

We claim:

1. A method for resolving a mixture of adipic and succinic acids which comprises subjecting said mixture to a first fractional crystallization from a solvent selected from the class consisting of water and lower aliphatic ketones, to obtain a first crop of crystals containing a ratio of said acids one to another which is substantially different from the ratio remaining in its mother liquor, then evaporating said mother liquor to dryness and subjecting the residue to a second fractional crystallization from a solvent selected from the other of said solvent groups.

2. A process as defined in claim 1 wherein said ketone is acetone.

3. A process as defined in claim 1 wherein said ketone is methyl ethyl ketone.

4. A method for resolving a mixture of adipic and succinic acids which comprises subjecting said mixture to a first fractional crystallization from a solvent selected from the class consisting of water and lower aliphatic ketones, to obtain a first crop of crystals containing a ratio of said acids one to another which is substantially different from the ratio remaining in its mother liquor, then evaporating said mother liquor to dryness and subjecting the residue to a second fractional crystallization from a solvent selected from the other of said solvent groups to obtain a second crop of crystals containing a ratio of said acids one to another which is substantially different from the ratio remaining in its mother liquor, evaporating the mother liquor from said second fractional crystallization to dryness and recycling the residue therefrom to said first fractional crystallization.

5. A method for resolving a mixture of succinic and adipic acids, said mixture containing an adipic/succinic acid ratio which is substantially higher than the solubility ratio of said acids in water, which comprises subjecting said mixture to a first fractional crystallization from a water solution to recover a solid phase substantially enriched in adipic acid, continuing said first fractional crystallization until the ratio of adipic/succinic acids in the resulting mother liquor becomes substantially equal to their solubility ratio in water, evaporating said mother liquor to dryness, redissolving the residue in a lower aliphatic ketone solvent and subjecting the ketone solution to a second fractional crystallization to recover therefrom a solid phase substantially richer in succinic acid than the mother liquor solute.

6. A method as defined in claim 5 wherein said mother liquor from said second fractional crystallization is evaporated to dryness, and the residue is recycled to said first fractional crystallization.

7. A method for resolving a mixture of succinic and adipic acids, said mixture containing a succinic/adipic acid ratio which is substantially higher than the solubility ratio of said acids in a selected lower aliphatic ketone, which comprises subjecting said mixture to a first fractional crystallization from said lower aliphatic ketone solvent to recover a solid phase substantially enriched in succinic acid, continuing said first fractional crystallization until the ratio of succinic/adipic acids in the resulting mother liquor becomes substantially equal to their solubility ratio in said lower aliphatic ketone, evaporating said mother liquor to dryness, redissolving the residue in water and subjecting the water solution to a second fractional crystallization to recover therefrom a solid phase substantially richer in adipic acid than the mother liquor solute.

8. A method as defined in claim 7 wherein said motor liquor from said second fractional crystallization is evaporated to dryness, and the residue is recycled to said first fractional crystallization.

9. A method for recovering substantially pure dibasic acids from mixtures derived from the oxidation of a feed material selected from the group consisting of cyclohexane, cyclohexanol and cyclohexanone, which comprises removing unreacted nitric acid and feed material from said oxidation mixture, redissolving the solid oxidation products in water, subjecting the aqueous solution to a first fractional crystallization to obtain susbtantially pure adipic acid, evaporating the resulting mother liquor to dryness, extracting the solid residue from said evaporation with a monocyclic aromatic hydrocarbon to remove glutaric acid, redissolving the extracted residue in a lower aliphatic ketone solvent, subjecting the resulting ketone solution to a second fractional crystallization and recovering therefrom substantially pure succinic acid.

10. A process as defined in claim 9 wherein the mother liquor from said second fractional crystallization is evaporated to dryness to obtain a second solid residue, and wherein said second solid residue is recycled to said first fractional crystallization step.

11. A method for recovering substantially pure dibasic acids from mixtures derived from the oxidation of a feed material selected from the group consisting of cyclohexane, cyclohexanol and cyclohexanone, which comprises removing unreacted nitric acid and feed material from said oxidation mixture, redissolving the solid oxidation products in water, subjecting the aqueous solution to a first fractional crystallization to obtain substantially pure adipic acid and a first mother liquor, subjecting said first mother liquor to a second fractional crystallization to obtain a crude adipic acid and a second mother liquor, recycling said crude adipic acid to said first fractional crystallization, evaporating said second mother liquor to dryness, extracting the solid residue from said evaporation with a monocyclic aromatic hydrocarbon to remove glutaric acid, redissolving the extracted residue in a lower aliphatic ketone solvent, subjecting the resulting ketone solution to a third fractional crystallization and recovering therefrom substantially pure succinic acid.

References Cited in the file of this patent

UNITED STATES PATENTS

| | | |
|---|---|---|
| 2,343,534 | Cavanaugh et al. | Mar. 7, 1944 |
| 2,452,741 | Fleming | Nov. 2, 1948 |
| 2,533,620 | Polly | Dec. 12, 1950 |